United States Patent
Walden (10) Patent No.: US 9,642,303 B2
(45) Date of Patent: May 9, 2017

(54) GRASS CUTTER INCLUDING A FAN ABOVE THE MOWER DECK

(71) Applicant: KUBOTA CORPORATION, Osaka (JP)

(72) Inventor: Robert Walden, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/597,571

(22) Filed: Jan. 15, 2015

(65) Prior Publication Data

US 2016/0212937 A1 Jul. 28, 2016

(51) Int. Cl.
*A01D 61/00* (2006.01)
*A01D 34/71* (2006.01)
*A01D 43/077* (2006.01)
*A01D 34/66* (2006.01)

(52) U.S. Cl.
CPC .............. *A01D 34/71* (2013.01); *A01D 34/66* (2013.01); *A01D 43/077* (2013.01)

(58) Field of Classification Search
CPC .............. A01D 43/077; A01D 43/0775; A01D 43/063; A01D 34/71; A01D 2101/00
USPC ........................ 56/16.6, 13.3, 202, 13.4, 12.8
See application file for complete search history.

(56) References Cited

U.S. PATENT DOCUMENTS

| | | | | |
|---|---|---|---|---|
| 2,762,184 A | * | 9/1956 | Farrer ................... | A01D 43/077 56/13.4 |
| 3,091,906 A | * | 6/1963 | Hall ...................... | A01D 34/003 56/1 |
| 3,593,505 A | * | 7/1971 | Mittelstadt ............. | A01D 34/78 56/12.8 |
| 4,037,394 A | * | 7/1977 | Lindblad ............... | A01D 43/063 56/13.4 |
| 4,114,353 A | * | 9/1978 | Ansbaugh ............. | A01D 43/077 56/13.3 |
| 4,488,395 A | | 12/1984 | Mack | |
| 4,631,909 A | * | 12/1986 | McLane ............... | A01D 43/063 56/16.6 |
| 4,711,073 A | * | 12/1987 | Freier, Jr. ............. | A01D 43/077 56/13.3 |

(Continued)

FOREIGN PATENT DOCUMENTS

| | | |
|---|---|---|
| EP | 0 031 158 | 7/1981 |
| EP | 0 045 177 | 2/1982 |

(Continued)

OTHER PUBLICATIONS

European Search Report issued in Patent Application No. 15158544.5, dated Jun. 7, 2016.

*Primary Examiner* — Árpád Fábián-Kovács
(74) *Attorney, Agent, or Firm* — Greenblum & Bernstein, P.L.C.

(57) ABSTRACT

A grass cutter is provided with a mower and a duct. The mower includes a rotary blade which cuts grass by being driven to rotate, a mower deck which houses the rotary blade, and a fan which is arranged above the mower deck and generates carrier air. The duct includes a duct body which communicates with the mower deck and extends in a conveyance direction of grass clippings cut by the rotary blade, and an opening which is configured to allow carrier air generated by the fan to be introduced into the duct body.

12 Claims, 10 Drawing Sheets

(56) References Cited

U.S. PATENT DOCUMENTS

| | | | | |
|---|---|---|---|---|
| 4,773,205 A * | 9/1988 | Hansen | A01D 43/077 | 56/13.3 |
| 4,996,829 A * | 3/1991 | Saitoh | A01D 43/077 | 56/13.3 |
| 5,224,327 A * | 7/1993 | Minoura | A01D 43/077 | 56/13.3 |
| 5,435,118 A * | 7/1995 | Cobile | A01D 34/005 | 56/13.4 |
| 5,613,353 A * | 3/1997 | Kugler | A01D 42/005 | 56/12.7 |
| 5,873,225 A * | 2/1999 | Schaedler | A01D 43/077 | 56/13.3 |
| 5,960,616 A * | 10/1999 | Schaedler | A01D 43/077 | 56/17.5 |
| 6,073,430 A * | 6/2000 | Mullet | A01D 34/685 | 56/12.8 |
| 6,282,874 B1 * | 9/2001 | Schaedler | A01D 43/077 | 56/17.5 |
| 6,658,833 B2 * | 12/2003 | Dunning | A01G 1/125 | 56/16.6 |
| 6,675,566 B2 * | 1/2004 | Martignon | A01D 43/077 | 56/13.3 |
| 6,854,249 B1 * | 2/2005 | Samejima | A01D 69/00 | 56/13.3 |
| 7,069,712 B2 * | 7/2006 | Bauer | A01D 34/71 | 56/12.8 |
| 7,240,474 B2 * | 7/2007 | Buss | A01D 43/077 | 56/12.8 |
| 2002/0083694 A1 * | 7/2002 | Nagai | A01D 43/0635 | 56/16.8 |
| 2005/0279068 A1 * | 12/2005 | Bauer | A01D 34/71 | 56/12.8 |
| 2009/0282796 A1 | 11/2009 | Yoshihara et al. | | |
| 2014/0075900 A1 * | 3/2014 | Moroi | A01D 34/005 | 56/2 |
| 2014/0075901 A1 * | 3/2014 | Kimura | A01D 43/063 | 56/2 |
| 2016/0014962 A1 * | 1/2016 | Hoppel | A01D 43/063 | 56/16.8 |

FOREIGN PATENT DOCUMENTS

| | | | | |
|---|---|---|---|---|
| EP | 0 579 386 | 1/1994 | | |
| EP | 2 119 337 | 11/2009 | | |
| JP | 2009-50222 | 3/2009 | | |
| JP | EP 2842405 A1 * | 3/2015 | | A01D 34/005 |
| JP | EP 2878189 A1 * | 6/2015 | | A01D 34/81 |

* cited by examiner

GRASS CUTTER INCLUDING A FAN ABOVE THE MOWER DECK

TECHNICAL FIELD

The disclosure relates to a grass cutter provided with a rotary blade inside a mower deck.

BACKGROUND ART

JP 2009-50222 A discloses a grass cutter (lawn cutter) provided with a mower deck (housing) which is open downward, a grass collector (lawn clippings housing container) which is arranged behind the mower deck, two right and left rotary blades (cutting blades) which are housed inside the mower deck to cut lawn grass and generate carrier air, and a duct (shooter) which conveys lawn clippings from a central position in the width direction of the mower deck to the grass collector using the carrier air. The mower deck is provided with two auxiliary fans which increase the amount of carrier air. The auxiliary fans are arranged inside the mower deck as well as directly above the respective rotary blades. Carrier air generated by the auxiliary fans is guided to the duct. Accordingly, the carrier air generated by the rotary blades (main carrier air) and the carrier air generated by the auxiliary fans (auxiliary carrier air) are guided into the duct. As a result, it is possible to increase the total amount of carrier air.

In such a conventional grass cutter, the carrier air generated by the auxiliary fans (auxiliary carrier air) is first guided to the central position in the width direction of the mower deck. The mower deck branches into the duct and a space in which the rotary blades and the auxiliary fans are housed at the central position in the width direction. Thus, although part of the carrier air (auxiliary carrier air) that has been sent to the central position in the width direction of the mower deck is guided to the duct, the rest part of the carrier air (auxiliary carrier air) remains inside the mower deck. As a result, it is not possible to efficiently increase the total amount of carrier air inside the duct.

Further, the auxiliary fans are arranged inside the mower deck. Thus, the carrier air generated by the auxiliary fans (auxiliary carrier air) disturbs the flow of the carrier air generated by the rotary blades (main carrier air).

SUMMARY OF INVENTION

The object of the disclosure is to provide a grass cutter capable of efficiently increase the total amount of carrier air inside a duct.

One aspect of the disclosure provides a grass cutter provided with a mower which includes a rotary blade cutting grass by being driven to rotate, a mower deck housing the rotary blade, and a fan arranged above the mower deck, the fan generating carrier air; and a duct which includes a duct body communicating with the mower deck and extending in a conveyance direction of grass clippings cut by the rotary blade, and an opening configured to allow carrier air generated by the fan to be introduced into the duct body.

This configuration makes it possible to efficiently increase the total amount of carrier air inside the duct. Further, it is possible to prevent the flow of carrier air generated by the rotary blade from being disturbed inside the mower deck.

According to a preferred embodiment of the grass cutter, the duct body includes a side wall facing the fan, and the opening is formed on the side wall.

This configuration makes it possible to introduce a larger amount of carrier air generated by the fan into the duct.

According to a preferred embodiment of the grass cutter, the opening is formed at a position shifted to the conveyance direction from a rotation center of the rotary blade.

This configuration makes it possible to more easily guide the carrier air generated by the fan to the conveyance direction of the grass clippings inside the duct.

According to a preferred embodiment of the grass cutter, the duct further includes a guide member configured to guide carrier air generated by the rotary blade and carrier air generated by the fan to the conveyance direction.

This configuration makes it possible to more efficiently guide the carrier air generated by the rotary blade and the carrier air generated by the fan to the conveyance direction.

According to a preferred embodiment of the grass cutter, the guide member includes a first guide face guiding carrier air generated by the rotary blade and carrier air generated by the fan to the conveyance direction.

This configuration makes it possible to more efficiently guide the carrier air generated by the rotary blade and the carrier air generated by the fan to the conveyance direction.

According to a preferred embodiment of the grass cutter, the duct body includes a bottom plate, and the guide member is arranged in such a manner that the first guide face is continuous with an upstream side in the conveyance direction of the bottom plate along the conveyance direction.

This configuration makes it possible to more efficiently guide the carrier air generated by the rotary blade and the carrier air generated by the fan to the conveyance direction.

According to a preferred embodiment of the grass cutter, the guide member further includes a second guide face, and the second guide face includes a lower side face formed in a circular arc shape extending along a rotation trajectory of the rotary blade in bottom view and a ceiling face formed in continuous with an upper end of the lower side face, the ceiling face forming a ceiling portion.

This configuration makes it possible to actively guide grass clippings that have not been conveyed to the duct to the flow of the carrier air inside the mower deck (the carrier air generated by the rotary blade).

According to a preferred embodiment of the grass cutter, the ceiling face is located at substantially the same height as a lower end of the opening of the duct.

This configuration makes it possible to actively guide grass clippings that have not been conveyed to the duct to the flow of the carrier air inside the mower deck (the carrier air generated by the rotary blade).

According to a preferred embodiment of the grass cutter, the mower deck includes an upper face and a side face extending downward on the outer side of the upper face, and the upper face includes a first face substantially horizontally formed, a second face recessed from the first face, and a third face connecting the first face and the second face to each other.

This configuration makes it possible to increase the strength of the mower deck.

According to a preferred embodiment of the grass cutter, the fan is mounted on the second face.

This configuration makes it possible to arrange the fan at a low position.

DESCRIPTION OF EMBODIMENT

Hereinbelow, a grass cutter 1 which is an example of a grass cutter according to the disclosure will be described. Description will be made by defining directions indicated by arrows U, D, F, B, L, and R in the drawings as an upward direction, a downward direction, a forward direction, a rearward direction, a leftward direction, and a rightward direction, respectively. In each of the drawings, illustration of a member unnecessary for the description is appropriately omitted.

Figure 1:
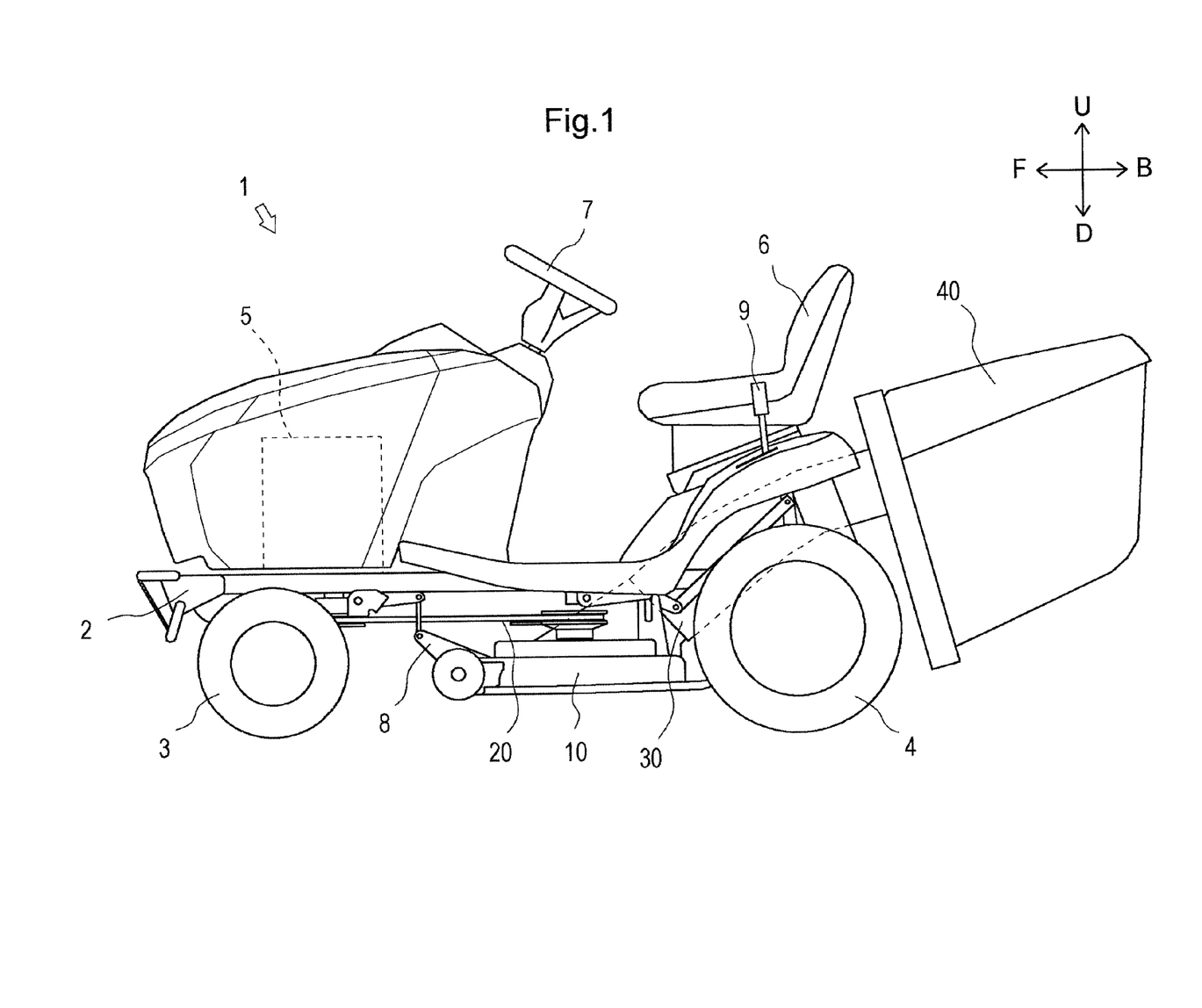
FIG. 1 is a side view illustrating a grass cutter which is an example of the disclosure.

First, the entire configuration of the grass cutter 1 will be described with reference to FIG. 1.

The grass cutter 1 is a working vehicle capable of cutting grass (lawn) while traveling. The grass cutter 1 is mainly provided with a traveling machine body 2, a pair of right and left front wheels 3, a pair of right and left rear wheels 4, an engine 5, a driver seat 6, a handle 7, a link mechanism 8, a control lever 9, a mower 10, a power transmission mechanism 20, a duct 30, and a grass collector 40.

The front part of the traveling machine body 2 is supported by the front wheels 3. The rear part of the traveling machine body 2 is supported by the rear wheels 4. The engine 5 is arranged in the front part of the traveling machine body 2. The driver seat 6 on which an operator sits is disposed in a front-rear intermediate part of the traveling machine body 2. The handle 7 is disposed in front of the driver seat 6.

The link mechanism 8, the mower 10, and the power transmission mechanism 20 are disposed under the traveling machine body 2. The control lever 9 is disposed beside the driver seat 6. The link mechanism 8 is coupled to the mower 10. The control lever 9 is coupled to the link mechanism 8.

The mower 10 is used for performing a grass-cutting operation using the power of the engine 5. The mower 10 is attached to the traveling machine body 2 through the link mechanism 8. The power transmission mechanism 20 couples the engine 5 and the mower 10 to each other, and transmits the power of the engine 5 to the mower 10. The duct 30 is arranged behind the mower 10 in communication with the mower 10. The grass collector 40 is arranged behind the duct 30 in communication with the duct 30. Grass clippings cut by the mower 10 pass through the duct 30 and are then collected into the grass collector 40.

An operator can perform a grass-cutting operation (lawn-cutting operation) by driving the mower 10. Further, an operator can adjust the up-down position of the mower 10 by operating the control lever 9.

Next, the configuration of the mower 10 will be described with reference to FIGS. 2 to 6.

The mower 10 is a working machine which cuts grass growing under the mower 10 so as to have a predetermined length (height). The mower 10 is arranged at substantially the center of the traveling machine body 2 as well as under the traveling machine body 2. The mower 10 is mainly provided with a mower deck 11, a pair of right and left rotary blades 12, a pair of right and left fans 13, a pair of right and left shafts 14, and a pair of right and left fan covers 15.

The mower deck 11 illustrated in FIGS. 2 to 6 forms a main structure of the mower 10. The mower deck 11 is used for housing the rotary blades 12. The mower deck 11 is formed in a bilaterally symmetrical shape, specifically, a generally laterally-facing "eight" shape in plan view. The mower deck 11 is open downward. The mower deck 11 is mainly provided with an upper face 111, a side face 112, shaft insertion holes 113, and a duct communication portion 114.

Figure 4:
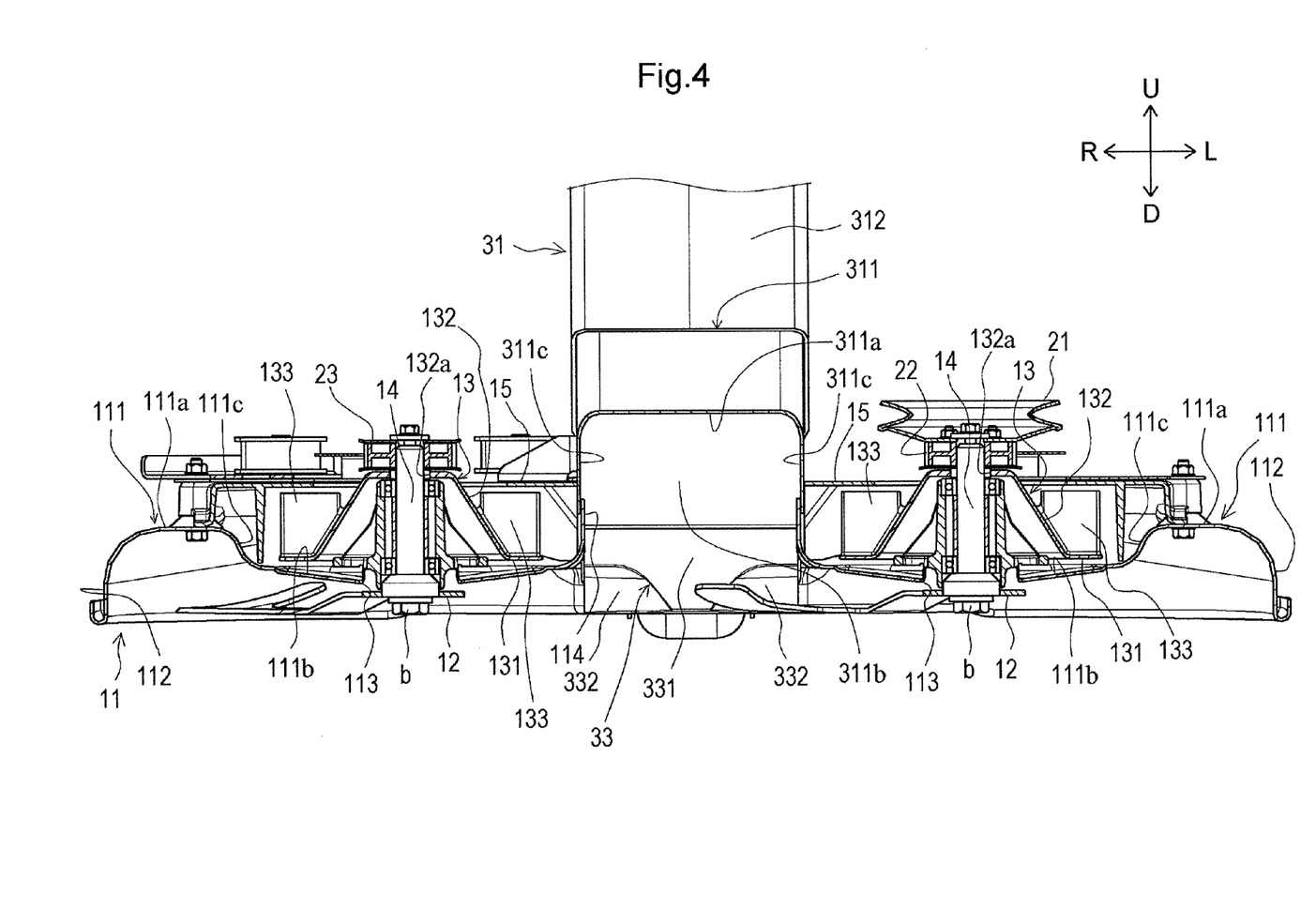
FIG. 4 is a cross-sectional view taken along line A-A in FIG. 3.
Figure 6:
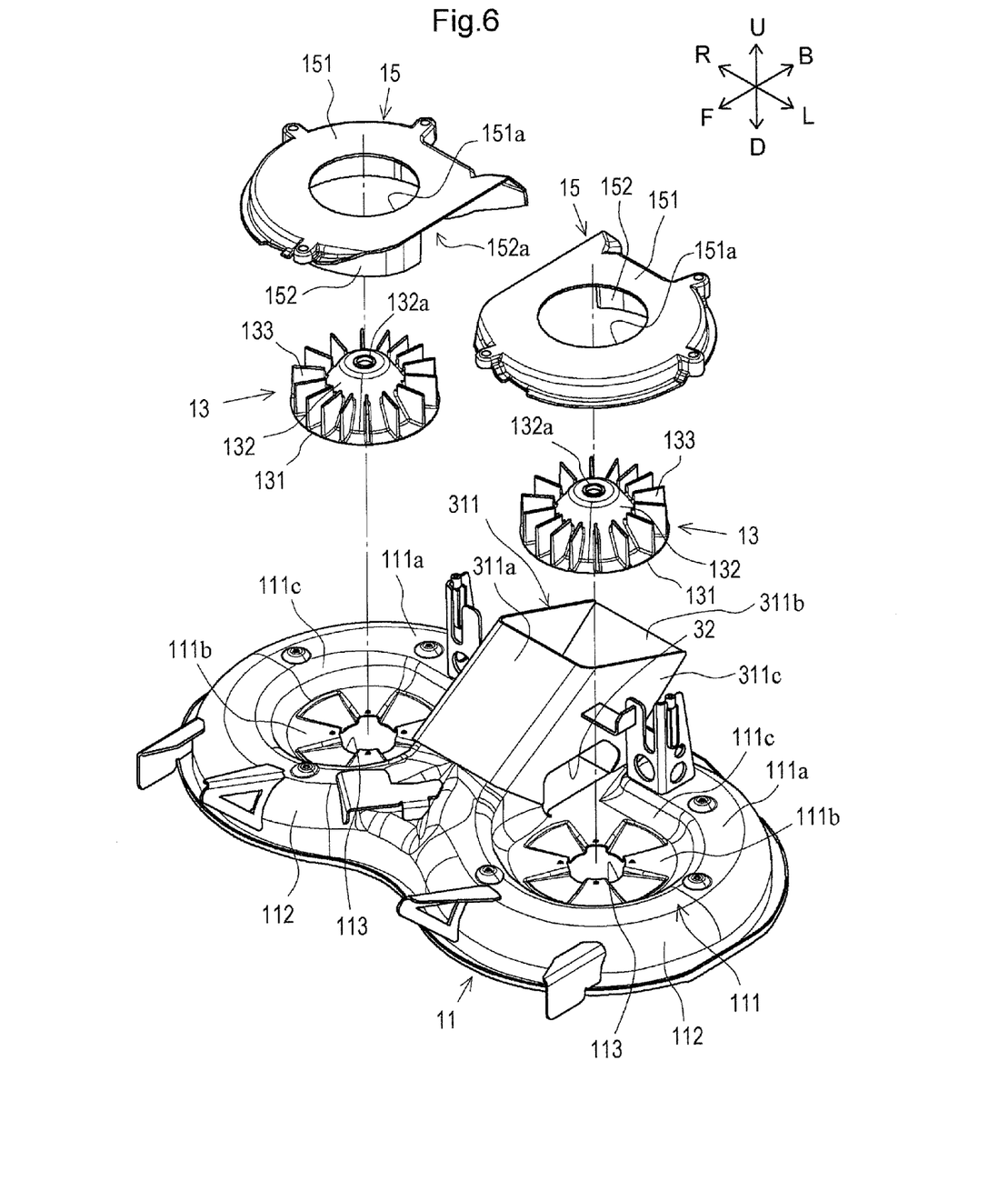
FIG. 6 is an exploded perspective view of the mower.

The upper face 111 illustrated in FIGS. 4 and 6 is formed on the upper part of the mower deck 11. The upper face 111 includes a first face 111a, second faces 111b, and third faces 111c.

The first face 111a is the highest face in the upper face 111. The first face 111a is substantially horizontally formed.

The fans 13 are mounted on the respective second faces 111b. Each of the second faces 111b is recessed from the first face 111a with the rotation center of the fan 13 being substantially the center of the second face 111b. The second faces 111b are formed on right and left sides of the mower deck 11. The second faces 111b extend up to side walls 311c of the duct 30 (refer to FIG. 6).

The third faces 111c connect the first face 111a and the second faces 111b to each other. Each of the third faces 111c is formed to extend upward (toward the first face 111a) from the outer peripheral edge of the corresponding second face 111b.

The side face 112 constitutes a side wall of the mower deck 11. The side face 112 is formed to extend downward from the outer peripheral edge of the first face 111a.

The upper face 111 and the side face 112 are integrally formed. Connected portions between the first face 111a, the third faces 111c, the second faces 111b, and the side face 112 are formed in a smoothly curved shape. A space covered by the first face 111a, the third faces 111c, the second faces 111b, and the side face 112 from the upward direction and the lateral direction is formed inside the mower deck 11.

The shaft insertion holes 113 illustrated in FIGS. 4 and 6 are used for inserting the respective shafts 14. The shaft insertion holes 113 are formed to vertically penetrate the respective second faces 111b of the mower deck 11. The shaft insertion holes 113 are formed on the respective right and left second faces 111b.

Figure 5:
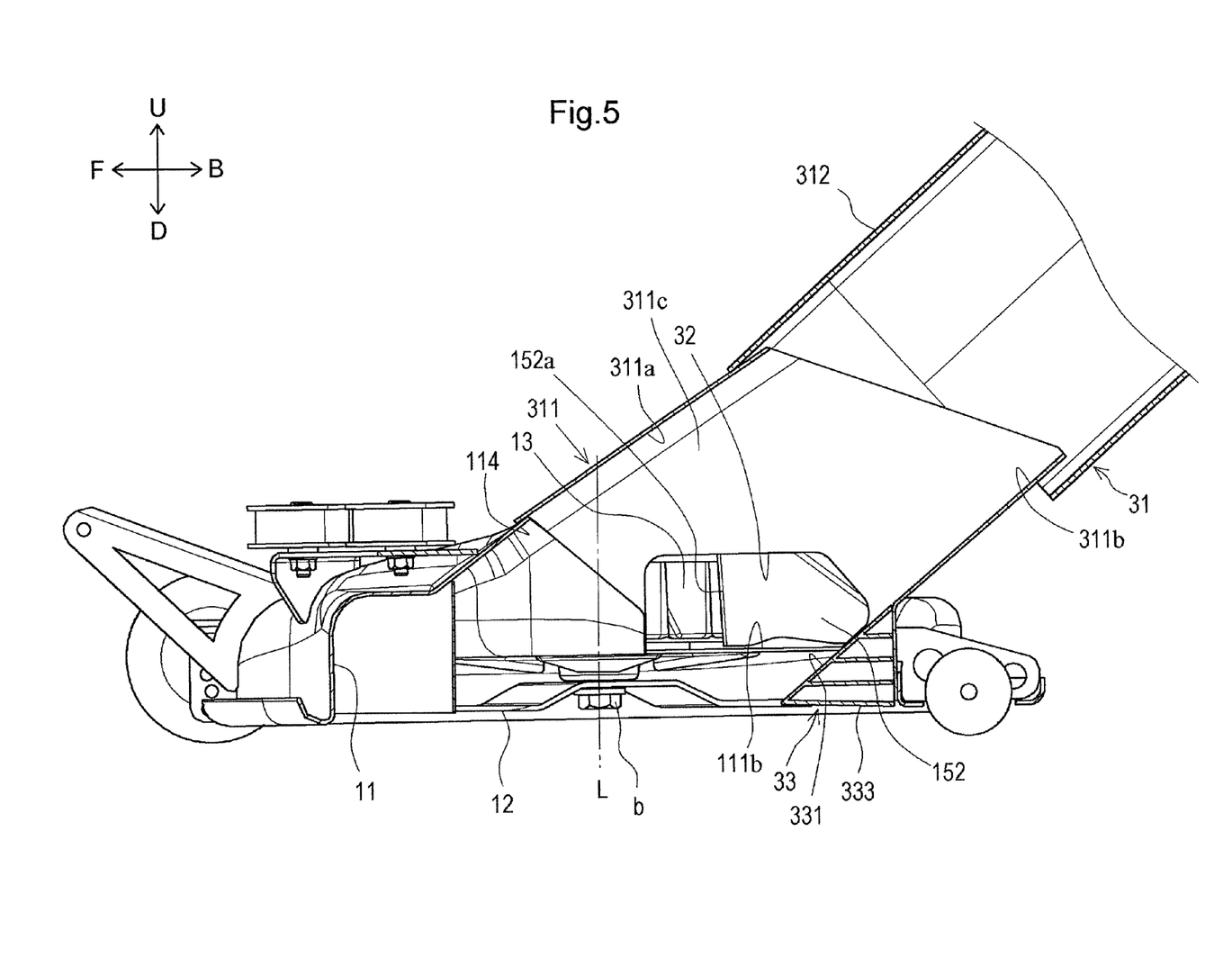
FIG. 5 is a cross-sectional view taken along line B-B in FIG. 3.

The duct communication portion 114 illustrated in FIGS. 4 and 5 is used for communication with the duct 30. The duct communication portion 114 is formed in a generally rectangular tubular shape obliquely extending upward and rearward from the first face 111a of the mower deck 11. The duct communication portion 114 is formed on a central position in the right-left direction of the mower deck 11. The rear end of the duct communication portion 114 communicates with the duct 30.

The mower deck 11 having such a configuration is provided with the first face 111a, the second faces 111b, the third face 111c, and the side face 112. Thus, it is possible to improve the strength of the mower deck 11. Further, the second faces 111b are recessed from the first face 111a.

Thus, it is possible to arrange the fans 13 at low positions, and also to make the shape of the mower 10 compact. In addition, it is possible to visually confirm the attachment positions of the fans 13.

Figure 3:
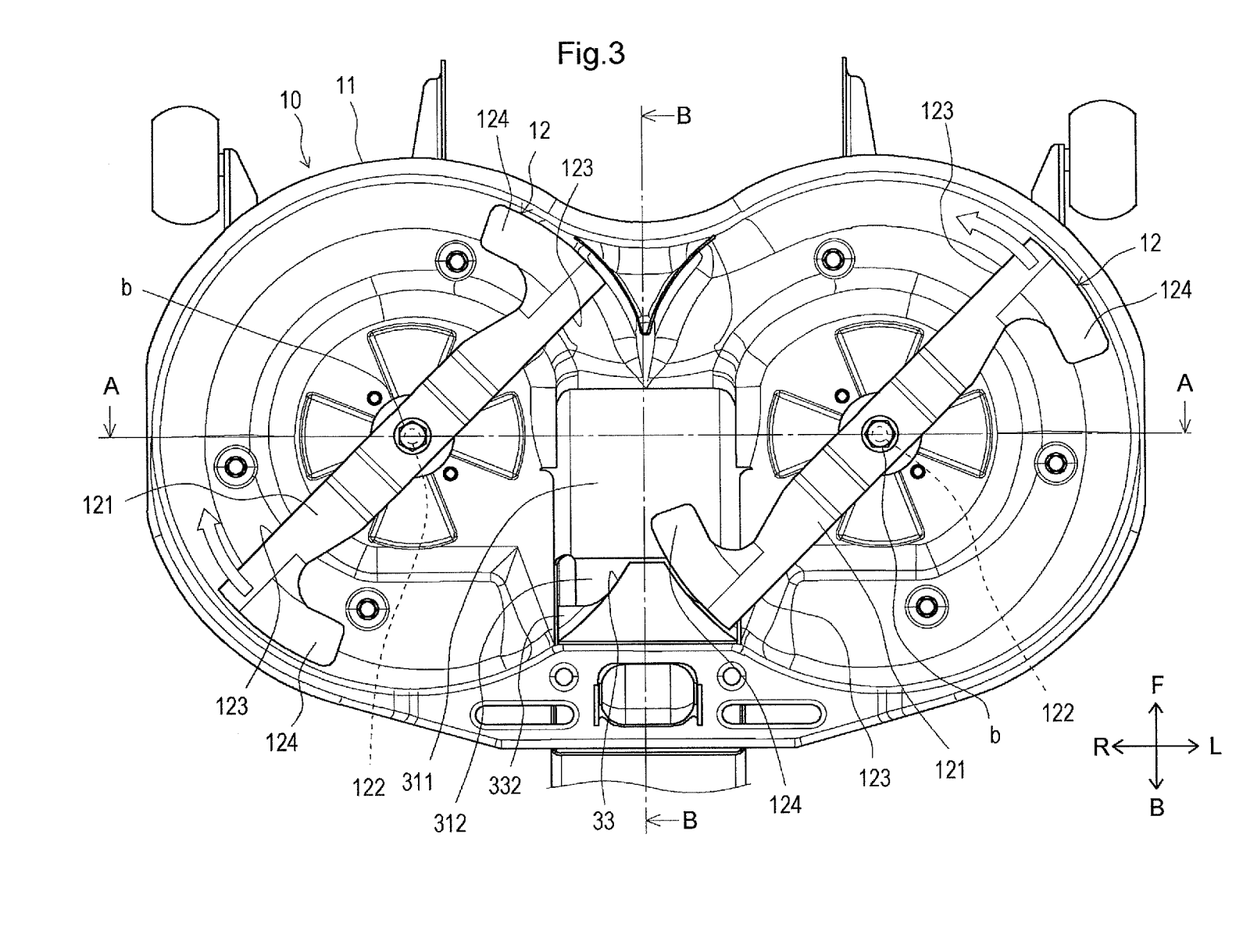
FIG. 3 is a bottom view of the mower.

The rotary blades 12 illustrated in FIG. 3 are used for cutting grass and, at the same time, generating carrier air for conveying the cut grass clippings rearward by being driven to rotate. Each of the rotary blades 12 is formed in a generally rectangular plate-like shape. The rotary blades 12 are housed inside the mower deck 11. The rotary blades 12 are arranged on the right and left sides of the mower deck 11. Each of the rotary blades 12 is provided with a blade body 121, a through hole 122, cutting edges 123, and projections 124.

The blade body 121 forms a main structure of the rotary blade 12. The blade body 121 is formed in a generally rectangular plate-like shape.

The through hole 122 is used for fixing the rotary blade 12 to the shaft 14. The through hole 122 vertically penetrates the blade body 121. The through hole 122 is formed on the center of the blade body 121. The rotary blade 12 is fixed to the lower part of the shaft 14 with a bolt b through the through hole 122.

The cutting edges 123 are used for cutting grass. The cutting edges 123 are formed on the front edges (the front edges with respect to the rotation direction) of the blade body 121.

The projections 124 are used for generating carrier air flowing from the mower deck 11 toward the duct 30. The projections 124 are formed to project in a direction opposite to the rotation direction of the rotary blade 12.

The fans 13 illustrated in FIGS. 4 and 6 are used for increasing the amount of carrier air inside the duct 30. The fans 13 are arranged above the mower deck 11. Specifically, the fans 13 are mounted on the respective right and left second faces 111b of the mower deck 11. Each of the fans 13 is arranged in a manner to align the axis of the fan 13 with the axis of the corresponding rotary blade 12. That is, as shown in the drawing figures, the fan 13 and the blade 12 are rotatable coaxially. Each of the fans 13 is mainly provided with a flat plate 131, a projection 132, and a plurality of vanes 133 (sixteen vanes 133 in the present embodiment).

The flat plate 131 is formed in a generally annular plate-like shape. The flat plate 131 is substantially horizontally arranged.

The projection 132 is formed in a truncated cone shape whose diameter decreases toward the upper side. The projection 132 projects upward in the central part of the flat plate 131. A center hole 132a is formed on the upper face of the projection 132.

The center hole 132a vertically penetrates the upper face of the projection 132. The center hole 132a is formed in a circular shape in plan view. The center hole 132a is formed on the center of the upper face of the projection 132.

The vanes 133 are used for generating an air current. Each of the vanes 133 is formed in a generally rectangular plate-like shape. The vanes 133 are formed on the flat plate 131 as well as around the projection 132 radially from the axes of the flat plate 131 and the projection 132.

The shafts 14 illustrated in FIG. 4 are used for rotating the rotary blades 12 and the fans 13. Each of the shafts 14 is formed in a cylindrical shape extending in the up-down direction. The shafts 14 are inserted into the respective shaft insertion holes 113 of the mower deck 11 in a manner to align the axes of the shafts 14 with the up-down direction. Each of the shafts 14 is arranged in a manner to align the axis of the shaft 14 with the axes of the shaft insertion holes 113, the rotary blade 12 and the fan 13. Each of the shafts 14 is fixed to the rotary blade 12, the fan 13, and the power transmission mechanism 20.

The fan covers 15 illustrated in FIG. 6 are used for guiding carrier air generated by the fans 13 toward the duct 30. The fan covers 15 are arranged to cover the respective fans 13. Each of the fan covers 15 is mainly provided with an outer plate 151 and a guide plate 152.

The outer plate 151 forms a main structure of the fan cover 15. The outer plate 151 is formed in a generally horizontal plate-like shape. A through hole 151a is formed on substantially the center of the outer plate 151. The through hole 151a vertically penetrates the outer plate 151.

The guide plate 152 is used for guiding the carrier air generated by the fan 13 toward the duct 30. The guide plate 152 has a generally annular shape in plan view and extends downward from the outer plate 151. The guide plate 152 is formed on the outer side of the through hole 151a. An opening 152a is formed on the guide plate 152 at a position facing the duct 30.

Next, the configuration of the power transmission mechanism 20 will be described.

Figure 2:
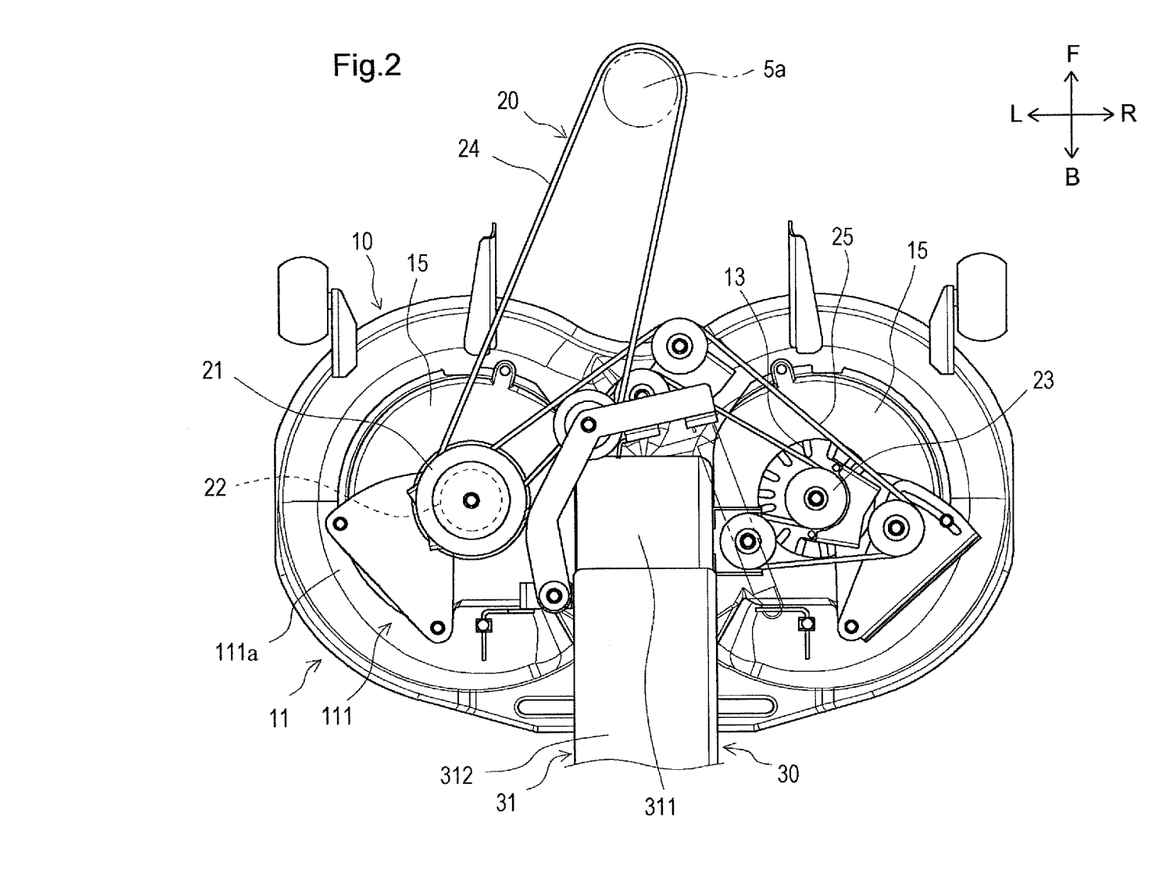
FIG. 2 is a plan view illustrating a mower and a power transmission mechanism.

The power transmission mechanism 20 illustrated in FIG. 2 is used for transmitting power obtained by the engine 5 to the rotary blades 12 and the fans 13. The power transmission mechanism 20 is mainly provided with a first pulley 21, a second pulley 22, a third pulley 23, a first belt 24, and a second belt 25.

The first pulley 21 is used for transmitting the power of the engine 5 to the left rotary blade 12 and the left fan 13. The first pulley 21 is arranged above the left fan 13. The first pulley 21 is arranged in a manner to align the axis of the first pulley 21 with the axes of the left rotary blade 12, the left fan 13, and the left shaft 14.

The second pulley 22 has a smaller diameter than the first pulley 21. The second pulley 22 is arranged directly below the first pulley 21 in a manner to align the axis of the second pulley 22 with the axis of the first pulley 21. The second pulley 22 is fixed to the first pulley 21, and also fixed to the left rotary blade 12 and the left fan 13 through the left shaft 14.

The third pulley 23 is used for transmitting the power of the engine 5 to the right rotary blade 12 and the right fan 13. The third pulley 23 is arranged above the right fan 13. The third pulley 23 is arranged in a manner to align the axis of the third pulley 23 with the axes of the right rotary blade 12, the right fan 13, and the right shaft 14. The third pulley 23 is fixed to the right rotary blade 12 and the right fan 13 through the right shaft 14.

The first belt 24 is used for transmitting the power of the engine 5 to the first pulley 21 and the second pulley 22. The first belt 24 couples a pulley 5a which is fixed to an output shaft of the engine 5 and the first pulley 21 to each other.

The second belt 25 is used for transmitting the power of the engine 5 that has been transmitted to the first pulley 21 and the second pulley 22 to the third pulley 23. The second belt 25 couples the second pulley 22 and the third pulley 23 to each other.

Next, the configuration of the duct 30 will be described with reference to FIGS. 4 to 10.

The duct 30 is used for conveying grass clippings cut by the rotary blades 12 rearward (toward the grass collector 40). The duct 30 is mainly provided with a duct body 31, openings 32, and a guide member 33.

The duct body 31 forms a main structure of the duct 30. The duct body 31 is a hollow member which extends in a conveyance direction of grass clippings cut by the rotary blades 12, that is, extends toward the grass collector 40. The duct body 31 allows the mower deck 11 and the grass collector 40 to communicate with each other. A conveyance path for conveying grass clippings cut by the rotary blades 12 is formed inside the duct body 31. The duct body 31 is provided with a mower side duct body 311 and a grass collector side duct body 312.

The mower side duct body 311 constitutes a part of the duct body 31, the part being arranged closer to the mower deck 11. The mower side duct body 311 communicates with the mower deck 11. Specifically, the mower side duct body 311 communicates with the duct communication portion 114 of the mower deck 11 at a central position in the right-left direction of the mower deck 11. The mower side duct body 311 is provided with an upper plate 311a, a bottom plate 311b, and right and left side walls 311c.

The upper plate 311a is a plate-like portion that forms the upper part of the mower side duct body 311.

The bottom plate 311b is a plate-like portion that forms the bottom part of the mower side duct body 311.

Each of the side walls 311c is a plate-like portion that forms the side part of the mower side duct body 311. The side walls 311c are formed to couple the upper plate 311a and the bottom plate 311b to each other on their right and left ends. The side walls 311c are formed at positions facing the respective fans 13.

The upper plate 311a, the bottom plate 311b, and the side walls 311c are integrally formed. The mower side duct body 311 having such a configuration is formed in a generally rectangular tubular shape.

The grass collector side duct body 312 constitutes a part of the duct body 31, the part being arranged closer to the grass collector 40. The grass collector side duct body 312 is formed to allow the mower side duct body 311 and the grass collector 40 to communicate with each other.

The openings 32 illustrated in FIG. 5 are used for introducing carrier air generated by the fans 13 into the duct body 31. The openings 32 are formed on the respective right and left side walls 311c of the mower side duct body 311. The openings 32 are formed to penetrate the side walls 311c in the right-left direction. Each of the openings 32 is formed in a generally rectangular shape by notching the lower end of the side wall 311c upward. That is, each of the openings 32 is formed in a manner to align the lower end of the opening 32 with the corresponding second face 111b of the mower deck 11. Each of the openings 32 is formed on the rear side (that is, closer to the grass collector 40) with respect to the rotation center (a rotation axis L illustrated in FIG. 5) of the rotary blade 12.

The guide member 33 illustrated in FIGS. 5 and 7 to 10 is used for guiding carrier air generated by the rotary blades 12 and carrier air generated by the fans 13 to the conveyance direction (that is, toward the grass collector 40). The guide member 33 is formed in a generally triangular prism shape and arranged in such a manner that triangular faces of the triangular prism (the bottom faces of the triangular prism) face the right-left direction. The lower part (the lower part in FIG. 7) of each of the triangular faces of the triangular prism (the bottom faces of the triangular prism) is notched toward the center in the right-left direction. The guide member 33 is arranged on a central position in the right-left direction of the mower deck 11. The guide member 33 is mainly provided with a first guide face 331, second guide faces 332, and a bottom face 333.

Figure 7:
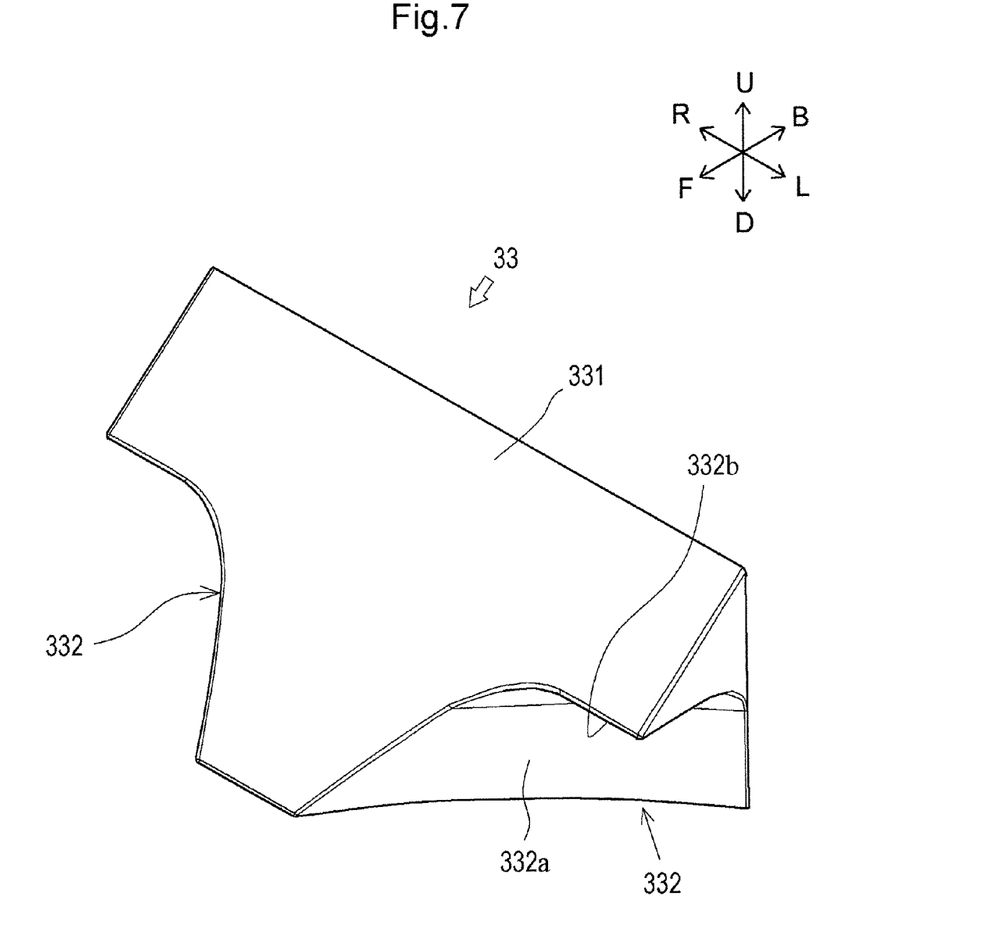
FIG. 7 is an upper-left perspective view of a guide member.
Figure 8A:
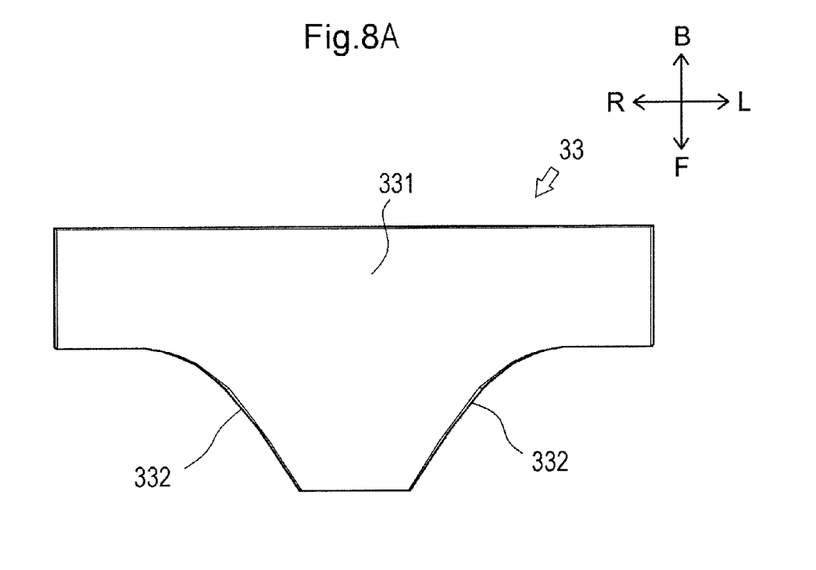
FIG. 8A is a plan view of the guide member.
Figure 8B:
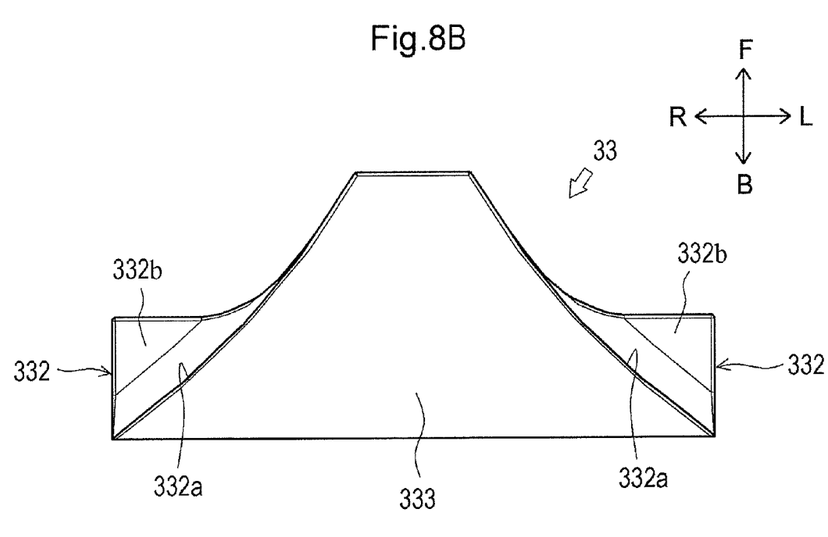
FIG. 8B is a bottom view of the guide member.
Figure 9A:
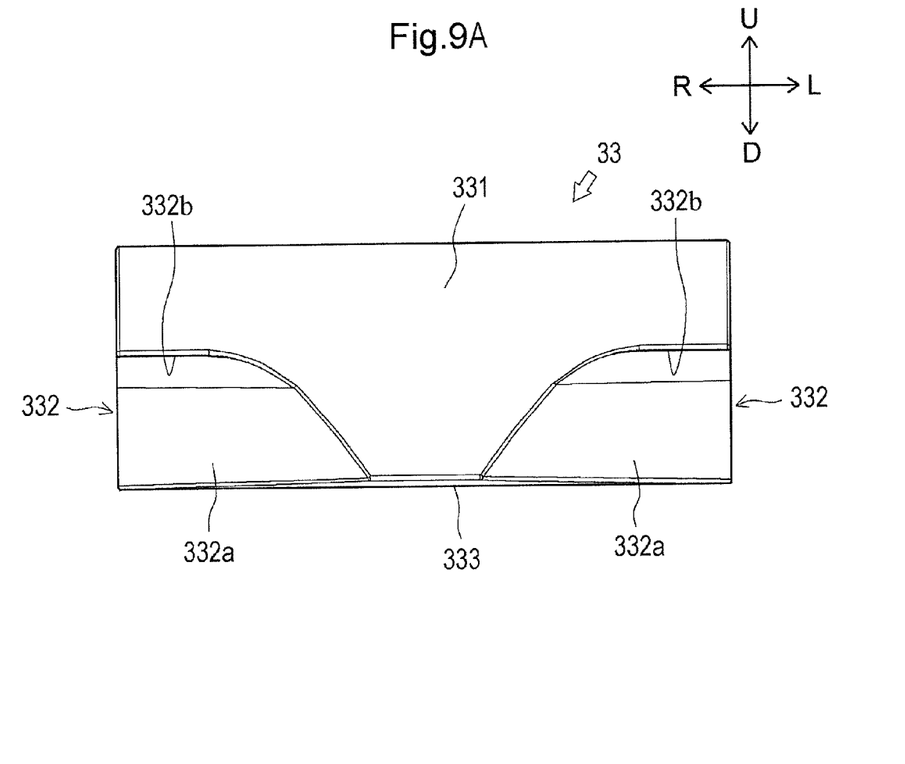
FIG. 9A is a front view of the guide member.
Figure 9B:
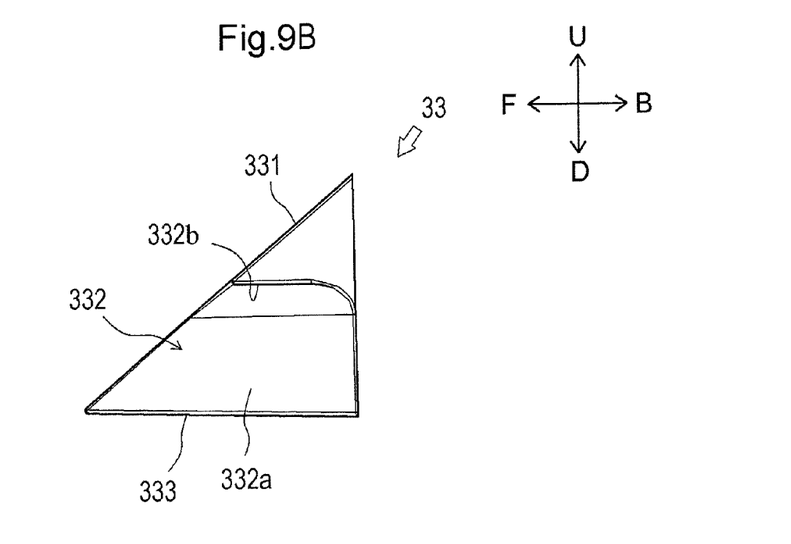
FIG. 9B is a left side view of the guide member.
Figure 10:
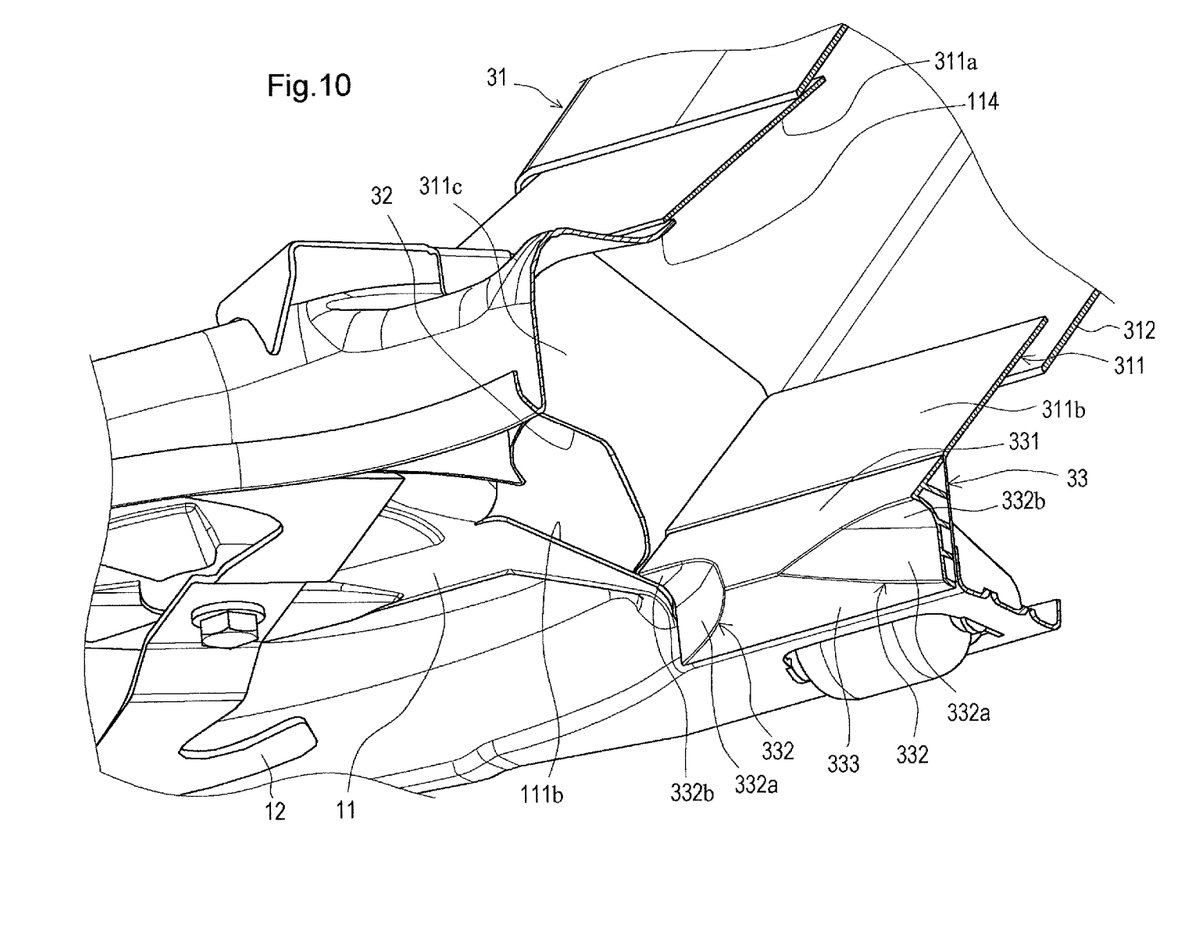
FIG. 10 is a perspective view illustrating the positional relationship between the guide member and an opening of a duct.

The first guide face 331 is used for guiding the carrier air inside the mower deck 11 (the carrier air generated by the rotary blades 12) and the carrier air introduced into the duct body 31 through the openings 32 (the carrier air generated by the fans 13) to the conveyance direction (that is, toward the grass collector 40). The first guide face 331 is continuous with the lower part of the bottom plate 311b of the mower side duct body 311 and extends obliquely forward and downward. The first guide face 331 is substantially parallel to the bottom plate 311b of the mower side duct body 311. A lower end part of the first guide face 331 is tapered obliquely forward and downward.

The second guide faces 332 are used for preventing contact between the guide member 33 and the rotary blades 12 and controlling the flow of the carrier air inside the mower deck 11 (the carrier air generated by the rotary blades 12). The second guide faces 332 are formed on the respective right and left sides (notched portions) of the guide member 33. Each of the second guide faces 332 is provided with a lower side face 332a and a ceiling face 332b.

The lower side face 332a forms a lower part of the second guide face 332. The lower side face 332a extends upward from the bottom face 333 up to substantially the center in the height direction of the guide member 33. The lower side face 332a is formed in a circular arc shape extending along the rotation trajectory of the rotary blade 12 in bottom view.

The ceiling face 332b is formed in continuous with the upper end of the lower side face 332a and forms a ceiling portion. Specifically, the ceiling face 332b substantially horizontally extends outward in the right-left direction from the upper end of the lower side face 332a. The ceiling face 332b is formed at substantially the same height as the lower end of the opening 32 of the duct 30 (the second face 111b of the mower deck 11).

Hereinbelow, the grass-cutting operation performed by the grass cutter 1 will be described.

The power of the engine 5 is transmitted to the first pulley 21 and the second pulley 22 through the first belt 24. Then, the power of the engine 5 is transmitted to the third pulley 23 through the second belt 25. The second pulley 22 is coupled to the left rotary blade 12 through the left shaft 14. The third pulley 23 is coupled to the right rotary blade 12 through the right shaft 14. Thus, the right and left rotary blades 12 rotate along with the rotation of the second pulley 22 and the third pulley 23. The right and left rotary blades 12 rotate in opposite directions to each other. Specifically, as indicated by arrows in FIG. 3, the right rotary blade 12 rotates in the clockwise direction, and the left rotary blade 12 rotates in the counterclockwise direction. The rotation of the rotary blades 12 enables the cutting edges 123 of the rotary blades 12 to cut grass.

Next, the flow of carrier air for conveying grass clippings cut by the rotary blades 12 to the grass collector 40 will be described.

As described above, the power of engine 5 causes the rotary blades 12 to rotate. The rotation of the rotary blades 12 makes it possible to cut grass and also to generate carrier air (main carrier air) by the projections 124 of the rotary blades 12. The carrier air generated by each of the rotary blades 12 (main carrier air) flows around inside the mower deck 11 in the same direction as the rotation direction of the rotary blade 12 and is guided to the duct communication portion 114 formed on the central position in the right-left direction of the mower deck 11. Grass clippings cut by each of the rotary blades 12 flow around inside the mower deck 11 and is then conveyed to the duct communication portion 114 by the main carrier air.

When each of the rotary blades 12 fixed to the shaft 14 rotates, the corresponding fan 13 fixed to the shaft 14 also rotates. When the fan 13 rotates, air present outside the fan cover 15 is introduced through the through hole 151a of the fan cover 15 and is discharged through the opening 152a by the action of the vanes 133 of the fan 13 and the fan cover 15 which covers the fan 13. Thus, the air present outside the fan cover 15 flows toward the duct 30 above the mower deck 11, and is introduced into the duct body 31 (the mower side duct body 311) through the opening 32 of the duct 30. That is, the carrier air generated by each of the fans 13 (auxiliary carrier air) is guided into the duct body 31 (the mower side duct body 311) through the opening 32 of the duct 30.

The carrier air generated by each of the rotary blades 12 (main carrier air) is guided to the conveyance direction (toward the grass collector 40) by the first guide face 331 of the guide member 33. Further, the carrier air generated by each of the fans 13 and introduced through each of the openings 32 (auxiliary carrier air) is also guided to the conveyance direction (toward the grass collector 40) by the first guide face 331 of the guide member 33. The carrier air generated by each of the rotary blades 12 (main carrier air) and the carrier air generated by each of the fans 13 (auxiliary carrier air) enable the grass clippings to be conveyed to the grass collector 40 and to be housed in the grass collector 40.

As described above, the carrier air generated by each of the fans 13 (auxiliary carrier air) is guided to the conveyance direction (toward the grass collector 40) in addition to the carrier air generated by each of the rotary blades 12 (main carrier air) inside the duct body 31. Thus, it is possible to increase the total amount of carrier air inside the duct. Further, the openings 32 are formed on the respective side walls 311c of the mower side duct body 311. Thus, the carrier air generated by each of the fans 13 (auxiliary carrier air) is directly introduced into the duct 30. Accordingly, it is possible to guide the carrier air generated by each of the fans 13 (auxiliary carrier air) into the duct without waste, that is, to guide a larger amount of auxiliary carrier air into the duct. As a result, it is possible to efficiently increase the total amount of carrier air inside the duct and also to easily convey grass clippings inside the mower deck 11 to the grass collector 40. Further, since the carrier air generated by each of the fans 13 (auxiliary carrier air) is directly fed into the duct 30, it is possible to increase the total amount of carrier air without disturbing the flow of the carrier air generated by each of the rotary blades 12 (main carrier air) inside the mower deck 11.

The openings 32 of the duct 30 are formed on the rear side with respect to the rotation centers of the rotary blades 12. Thus, it is possible to guide the carrier air generated by each of the fans 13 (auxiliary carrier air) into the duct 30 at a position closer to the grass collector 40. Accordingly, it is possible to more easily guide the carrier air generated by each of the fans 13 (auxiliary carrier air) to the grass collector 40.

Most of the grass clippings flowing around inside the mower deck 11 are conveyed to the duct body 31 by the first guide face 331 of the guide member 33 and then housed in the grass collector 40. On the other hand, some of the grass clippings flowing around inside the mower deck 11 that have not been conveyed to the duct body 31 are actively guided to the flow of the main carrier air flowing around inside the mower deck 11 by the second guide faces 332 of the guide member 33 so as to again join the flow of the main carrier air. Accordingly, the grass clippings that have not been conveyed to the duct body 31 again flow around inside the mower deck 11, and are then conveyed to the duct body 31 by the first guide face 331 of the guide member 33. As a result, it is possible to convey all the grass clippings cut by the rotary blades 12 to the grass collector 40. Further, it is possible to prevent the grass clippings from remaining in a region in which the duct communication portion 114 of the mower deck 11 and the mower side duct body 311 communicate with each other.

The grass cutter 1 according to the present embodiment having the above configuration makes it possible to efficiently increase the total amount of carrier air inside the duct 30. Further, it is possible to prevent the flow of the carrier air generated by each of the rotary blades 12 from being disturbed inside the mower deck 11.

The embodiment of the disclosure has been described above. However, the disclosure is not limited to the above configurations, and various modifications may be made within the scope of the disclosure described in the claims.

For example, in the present embodiment, each of the openings 32 of the duct 30 is formed by notching the lower end of the side wall 311c of the mower side duct body 311 upward. However, the disclosure is not limited to this configuration. For example, each of the openings 32 may be formed in a generally rectangular shape in such a manner that the lower end of the opening 32 is located at a higher position than the lower end of the side wall 311c, that is, in an intermediate part in the up-down direction of the side wall 311c. The size of the openings 32 is not limited to the illustrated size, and may be appropriately modified. The openings 32 have a generally rectangular shape in the present embodiment. However, the shape of the openings 32 is not limited to a rectangular shape, and may be appropriately modified. Further, each of the openings 32 is formed on the rear side with respect to the rotation center (the rotation center L illustrated in FIG. 5) of the rotary blade 12. However, the position of each of the openings 32 is not limited thereto, and each of the openings 32 may be formed on the front side with respect to the rotation center of the rotary blade 12.

What is claimed is:
1. A grass cutter comprising:
a mower comprising:
a rotary blade cutting grass by being driven to rotate;
a mower deck housing the rotary blade below a top of the mower deck;
a fan; and
a fan cover that covers the fan, the fan cover being separate from and arranged above the top of the mower deck, the fan generating carrier air;
the fan and the blade being rotatable coaxially; and
a duct comprising:
a duct body communicating with the mower deck and extending in a conveyance direction of grass clippings cut by the rotary blade;
the duct body including a side wall facing the fan; and
a carrier-air opening configured to allow carrier air generated by the fan to be introduced into the duct body;
the carrier-air opening being formed on the side wall.

2. The grass cutter according to claim 1, wherein the opening is formed at a position shifted to the conveyance direction from a rotation center of the rotary blade.

3. The grass cutter according to claim 2, wherein the duct further comprises a guide member configured to guide a carrier air generated by the rotary blade and the carrier air generated by the fan to the conveyance direction.

4. The grass cutter according to claim 3, wherein the guide member includes a first guide face guiding carrier air generated by the rotary blade and carrier air generated by the fan to the conveyance direction.

5. The grass cutter according to claim 4, wherein the duct body includes a bottom plate, and the guide member is arranged in such a manner that the first guide face is continuous with an upstream side in the conveyance direction of the bottom plate along the conveyance direction.

6. The grass cutter according to claim 5, wherein:
the guide member further includes a second guide face, and
the second guide face includes a lower side face formed in a circular arc shape extending along a rotation trajectory of the rotary blade in bottom view and a ceiling face formed in continuous with an upper end of the lower side face, the ceiling face forming a ceiling portion.

7. The grass cutter according to claim 6, wherein the ceiling face is located at substantially the same height as a lower end of the opening of the duct.

8. The grass cutter according to claim 1, wherein the mower deck includes an upper face and a side face extending downward on an outer side of the upper face, and the upper face includes a first face substantially horizontally formed, a second face recessed from the first face, and a third face connecting the first face and the second face to each other.

9. The grass cutter according to claim 2, wherein the mower deck includes an upper face and a side face extending downward on an outer side of the upper face, and the upper face includes a first face substantially horizontally formed, a second face recessed from the first face, and a third face connecting the first face and the second face to each other.

10. The grass cutter according to claim 8, wherein the fan is mounted on the second face.

11. The grass cutter according to claim 9, wherein the fan is mounted on the second face.

12. The grass cutter according to claim 1, wherein:
the duct body comprises a mower deck opening, and
the carrier-air opening is separate from the mower deck opening.

* * * * *